(No Model.)

J. D. THOMAS.
WHIFFLETREE HOOK.

No. 263,245. Patented Aug. 22, 1882.

Attest:
F. H. Schott
J. A. Stockman

Inventor:
John D. Thomas
ᵱ C. H. Watson & Co.
atty.

UNITED STATES PATENT OFFICE.

JOHN D. THOMAS, OF FORREST CITY, ARKANSAS.

WHIFFLETREE-HOOK.

SPECIFICATION forming part of Letters Patent No. 263,245, dated August 22, 1882.

Application filed June 16, 1882. (No model.)

*To all whom it may concern:*

Be it known that I, JOHN D. THOMAS, a citizen of the United States, residing at Forrest City, in the county of St. Francis and State of Arkansas, have invented certain new and useful Improvements in Whiffletree-Hooks; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to certain new and useful improvements in whiffletree-hooks or devices for connecting single-trees and double-trees together, or with the pole or tongue of a wagon or a plow-beam; and it consists in the peculiar construction of said hook, as will be hereinafter more fully set forth and described.

Figure 1:
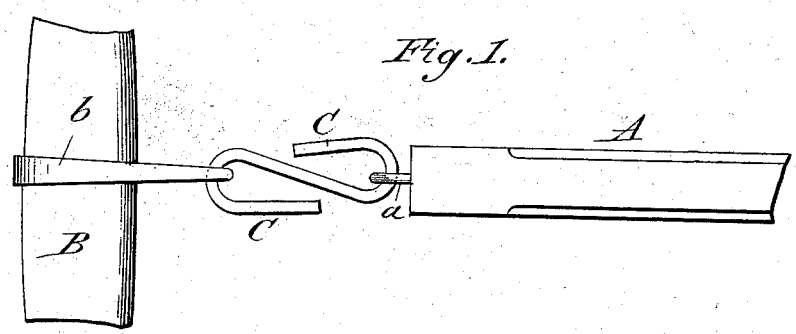
Figure 2:
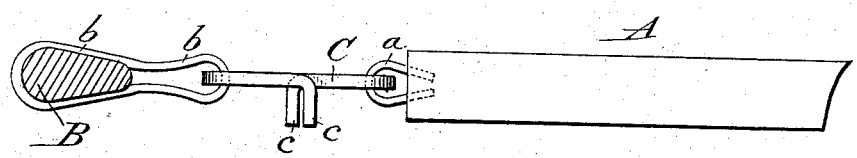
Figure 3:
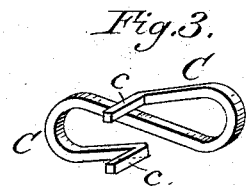

In the annexed drawings, Figure 1 is a plan view of the device as applied to and connecting a single-tree with a plow-beam. Fig. 2 is a side view of same, and Fig. 3 is a perspective view of the hook detached.

Like letters indicate like parts in the several views.

A represents a plow-beam, provided at its forward end with a staple, $a$, and B is a single-tree, which is provided with the usual connecting-band, $b$.

C is an S-shaped whiffletree or coupling hook, the ends $c\ c$ of which are bent at a right angle to its main portion or body, as shown in the drawings. The ends $c$ of the hook C, at their base or commencement, are brought near to the body of said hook C, so as to just permit the staple $a$ of the plow-beam A and the band $b$ of the single-tree B to be forced past said ends, between them and the body of the hook, in connecting the parts. By this means the hook C cannot by accident become detached from the plow-beam A or single-tree B. By bending the ends $c$ of the hook C at a right angle to its body or main portion the tendency which said hook has to disengage itself from the beam A and single-tree B when the draft is discontinued is entirely overcome, as said bent ends will come in contact with the staple $a$ and band $b$ of said parts, and thus be prevented from unhooking.

By the use of the hooks heretofore employed, the ends of which have been of a square and even slightly-pointed form, the legs of the horse or draft-animal have been severely cut and injured by said hooks coming in contact therewith; but I overcome this objection by bending the ends $c$ of the hook C as above described.

The advantages of my invention are its cheapness, strength, durability, simplicity, and ease of attachment.

Having thus described my invention, what I claim as new, and desire to secure by Letters Patent, is—

1. The S-shaped whiffletree-hook C, having its ends $c$ bent at a right angle to the main portion or body thereof, substantially as shown and described.

2. The combination of the plow-beam A, having staple $a$, single-tree B, having connecting-band $b$, and the S-shaped whiffletree-hook C, having its ends $c$ bent at a right angle to the main portion or body thereof, substantially as shown and described.

In testimony whereof I affix my signature in presence of two witnesses.

JOHN D. THOMAS.

Witnesses:
JESSE W. WYNNE,
F. H. WILLIAMS.